United States Patent [19]

Yanai et al.

[11] Patent Number: 4,669,360
[45] Date of Patent: Jun. 2, 1987

[54] POWER STEERING SYSTEM

[75] Inventors: Tokiyoshi Yanai, Yokosuka; Hirotsugu Yamaguchi, Chigasaki; Masafumi Nakayama, Yamato; Megumu Higuchi, Tokyo; Yutaka Aoyama, Yokosuka; Moritsune Nakata, Yokohama, all of Japan

[73] Assignee: Nissan Motor Company, Limited, Yokohama, Japan

[21] Appl. No.: 724,643

[22] Filed: Apr. 18, 1985

[30] Foreign Application Priority Data

Apr. 20, 1984 [JP] Japan .................................. 59-80779
Apr. 20, 1984 [JP] Japan .............................. 59-59119[U]

[51] Int. Cl.$^4$ ............................................... F15B 9/10
[52] U.S. Cl. ....................................... 91/382; 251/213
[58] Field of Search ................ 91/368, 382; 74/99 R, 74/99 A; 251/213

[56] References Cited

U.S. PATENT DOCUMENTS

| 2,782,652 | 2/1957 | Fletcher | 91/382 |
| 3,023,827 | 3/1962 | Sheler | 91/368 |
| 3,292,499 | 12/1966 | Duffy | 91/382 |
| 3,733,967 | 5/1973 | Duffy | 91/382 |
| 4,369,694 | 1/1983 | Perineau | 91/382 |
| 4,465,101 | 8/1984 | Hasegawa | 91/368 |

FOREIGN PATENT DOCUMENTS 55-123566 9/1980 Japan .

Primary Examiner—Robert E. Garrett
Assistant Examiner—Mark A. Williamson
Attorney, Agent, or Firm—Schwartz, Jeffery, Schwaab, Mack, Blumenthal & Evans

[57] ABSTRACT

An input shaft and an output shaft can rotate relative to each other. Pressure supplied to a pressure-responsive actuator depends on the axial position of a movable valve member. A transmission arrangement serves to move the valve member only in the axial direction as the input and output shafts rotate relative to each other. The valve member and each of the input and output shafts are wholly outside one another.

6 Claims, 6 Drawing Figures

POWER STEERING SYSTEM

BACKGROUND OF THE INVENTION

1. Field of the Invention

This invention relates to a power steering system including a torsion bar for sensing a steering force input.

2. Description of the Prior Art

Japanese patent publication 55-123566 discloses a power steering system including a torsion bar connected between an input shaft and an output shaft. Torsional displacement of the bar depends on the steering force input.

A control valve adjusts the hydraulic pressure applied to a power cylinder connected to a steering linkage. The control valve has a spool, the axial position of which determines the level of hydraulic pressure applied to the power cylinder. A transmission device connecting the torsion bar to the spool allows the spool to move axially in accordance with torsional displacement of the bar.

The input shaft extends through the spool which is annular. To allow smooth rotation of the input shaft relative to the spool without unwanted displacement of the spool in a direction perpendicular to its axis, it is necessary to severely limit the tolerances for the input shaft and the spool.

The number of parts of the transmission device is inconveniently large.

SUMMARY OF THE INVENTION

It is an object of this invention to provide a power steering system which allows its member larger tolerances than in the system of the prior art.

It is another object of this invention to provide a power steering system having fewer parts than the system of the prior art.

In accordance with this invention, a power steering system includes an input shaft and an output shaft rotatable relative to each other. Pressure applied to a pressure-responsive actuator depends on the axial position of a valve member. A transmission arrangement serves to move the valve member only in the axial direction as the input and output shafts rotate relative to each other. The valve member and each of the input and output shafts are wholly outside one another.

BRIEF DESCRIPTION OF THE DRAWINGS

Corresponding and like elements are denoted by the same reference characters throughout the drawings.

DESCRIPTION OF THE PREFERRED EMBODIMENTS

Figure 1:
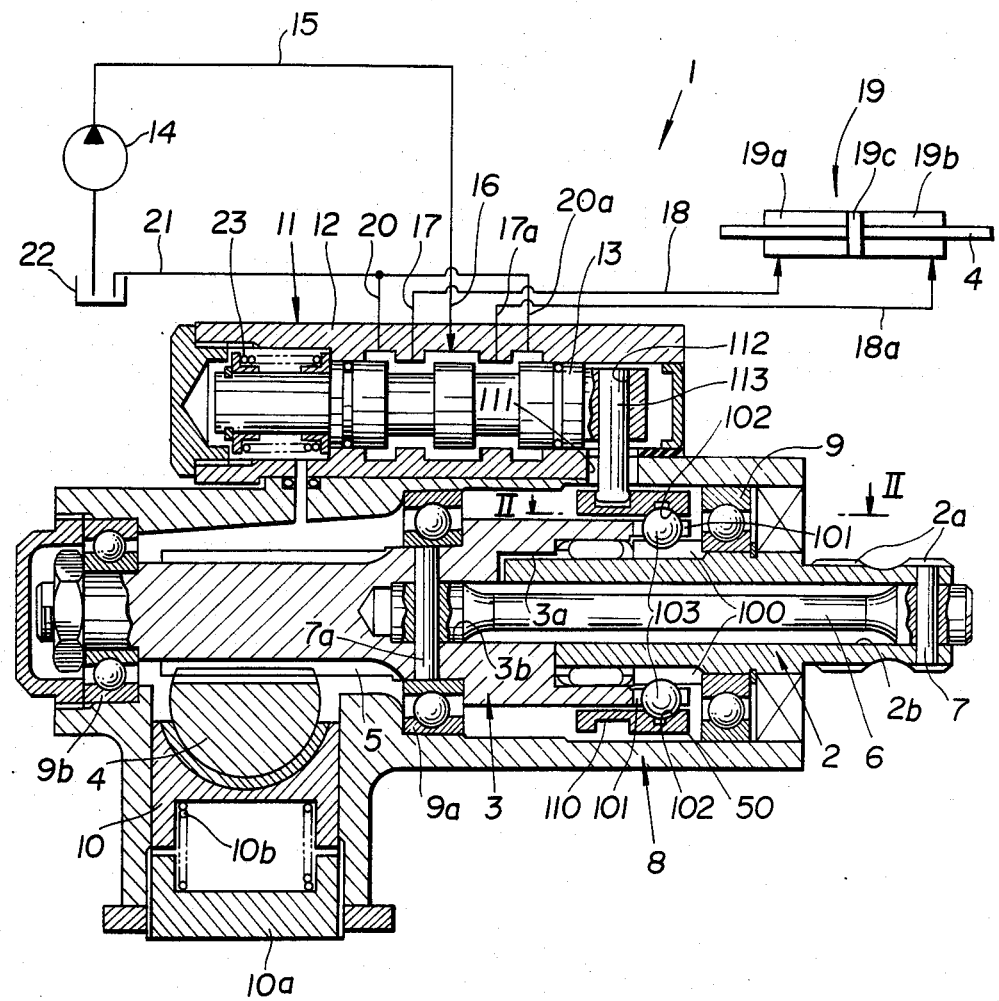
FIG. 1 is a longitudinal section view, partly diagrammatic, of a power steering system according to a first embodiment of this invention.

With reference to FIG. 1 illustrating a first embodiment of this invention, a power steering system 1 includes an input shaft 2 and an output shaft 3. The input shaft 2 has splines 2a via which the shaft 2 is connected to a steering shaft (not shown). The output shaft 3 includes a pinion 5 meshing with a rack 4.

The right-hand end of the output shaft 3 as viewed in FIG. 1 has an axial bore 3a into which the input shaft 2 extends. The shafts 2 and 3 align axially. The shafts 2 and 3 can rotate relative to each other.

Bore 2b coaxially extends through the input shaft 2. The output shaft 3 has an axial blind bore 3b aligned coaxially with the bore 2b of the input shaft 2. The bores 2b and 3b accommodate a torsion bar 6. A pin 7 extends diametrically through the right-hand end of the torsion bar 6 as viewed in FIG. 1 and projects into radial holes through the input shaft 2. In this way, the right-hand end of the torsion bar 6 is connected to the input shaft 2 so as to rotate together with the input shaft 2. Similarly, another pin 7b extends through the left-hand end of the torsion bar 6 as viewed in FIG. 1 and projects into radial holes through the output shaft 3. Thus, the left-hand end of the torsion bar 6 is connected to the output shaft 3 so as to rotate together with the output shaft 3.

A gear housing 8 encloses the shafts 2 and 3. A bearing 9 seated between the gear housing 8 and the input shaft 2 rotatably supports the input shaft 2 on the gear housing 8. A pair of bearings 9a and 9b seated between the gear housing 8 and the output shaft 3 rotatably support the output shaft 3 on the gear housing 8.

A lower part of the rack 4, i.e., the side distal from its toothed part, is slidably received by a retainer 10 supported within the gear housing 8. The retainer 10 can slide along the inner surfaces of the gear housing 8 toward and away from the rack 4. A plug 10a secured to the gear housing 8 via threads opposes the retainer 10. A spring 10b seated between the retainer 10 and the plug 10a urges the rack 4 via the retainer 10 into secure engagement with the pinion 5.

A control valve 11 extending parallel to the shafts 2 and 3 adjoins the upper outside surface of the gear housing 8. The control valve 11 includes a housing 12 and a valve spool 13 slidably disposed within the housing 12. The valve housing 12 is fixed to the gear housing 8. The valve spool 13 can reciprocate axially, i.e., parallel to the axes of the shafts 2 and 3.

An oil pump 14 of the constant-flow-rate type drives working fluid or oil from a reservoir oil tank 22 into the control valve 11 via a passage 15 and a main port 16 extending through the walls of the valve housing 12. A left-hand port 17 extending through the walls of the valve housing 12 is connected via a passage 18 to a left-hand working chamber 19a of a power cylinder 19. A right-hand port 17a extending through the walls of the valve housing 12 is connected via a passage 18a to a right-hand working chamber 19b of the power cylinder 19. Drain ports 20 and 20a extending through the walls of the valve housing 12 lead to the reservoir tank 22 via a drain passage 21.

The power cylinder 19 includes a slidable piston 19c separating the working chambers 19a and 19b. The piston 19c moves in accordance with the difference in pressure between the working chambers 19a and 19b. The rack 4 is secured to the piston 19c so that the rack 4 moves axially with the piston 19c. It should be noted that in FIG. 1, the power cylinder 19 is diagrammatically illustrated and the rack 4 is illustrated in two ways to facilitate understanding.

As the valve spool 13 moves axially in one direction, the effective cross-sectional area of a fluid communication path between the main port 16 and the left-hand port 17 increases while the effective cross-sectional area of a fluid communication path between the main port 16 and the right-hand port 17a decreases. As the valve spool 13 moves axially in the opposite direction, the former cross-sectional area decreases while the latter cross-sectional area increases. Furthermore, as the valve spool 13 blocks the communication path between the main port 16 and the left-hand port 17, it unblocks a fluid communication path between the left-hand port 17 and the drain port 20. As the valve spool 13 blocks the communication path between the main port 16 and the right-hand port 17a, it unblocks a fluid communication path between the right-hand port 17a and the drain port 20a. In this way, the axial position of the valve spool 13 determines the effective cross-sectional areas of these communicaton paths.

Pressure developed in the left-hand working chamber 19a of the power cylinder 19 depends on the effective cross-sectional area of the communication path between the main port 16 and the left-hand port 17 and also on the effective cross-sectional area of the communication path between the left-hand port 17 and the drain port 20. Pressure developed in the right-hand working chamber 19b depends on the effective cross-sectional area of the communication path between the main port 16 and the right-hand port 17b and also on the effective cross-sectional area of the communication path between the right-hand port 17b and the drain port 20a. Accordingly, the difference in pressure between the working chambers 19a and 19b varies as a function of the axial position of the valve spool 13.

The rack 4 is connected to one end of steering train, such as a steering linkage. The difference in pressure between the working chambers 19a and 19b, that is, the pressure differential across the piston 19c, forces the rack 4 axially, applying a boosted steering force to the associated end of steering train. The boosted level of steering force as well as the direction of steering force depend on the axial position of the valve spool 13.

Figure 2:
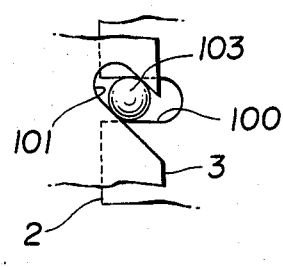
FIG. 2 is a plan view in the plane II—II of FIG. 1.

As shown in FIGS. 1 and 2, the portion of the cylindrical outer surface of the input shaft 2 overlapping the output shaft 3 has axial grooves 100 spaced circumferentially at substantially equal angular intervals. The right-hand tubular end of the output shaft 3 has spiral grooves 101 substantially opposing and overlapping the respective axial grooves 100. The spiral grooves 102 are oblique to the axial grooves 100. A sleeve 50 coaxially encircles the overlapping portions of the shafts 2 and 3. This sleeve 50 is designed to be free to move axially but to have no radial play. The inner surface of the sleeve 50 has a complete circumferential groove to recess 102 opposing the grooves 100 and 101. A ball 103 fits snugly into each of the spaces defined by the grooves 100, 101, and 102. The balls 103 extend through the grooves 101 and into the grooves 100 and 102, slidably engaging the shafts 2 and 3, and the sleeve 50.

A ball 103, the axial groove 100 and the spiral groove 101 receiving this ball constitute a set. There are two or more sets spaced circumferentially at substantially equal angular intervals. In the embodiment of FIGS. 1 and 2, there are two diametrically opposing sets.

The cylindrical outer surface of the sleeve 50 has a circumferential groove 110. The walls of the gear housing 8 and the valve housing 12 have the hole 111 extending radially with respect to the sleeve 50 opposite the circumferential groove 110. The right-hand end of the valve spool 13 has a diametrical hole 112 which aligns with the hole 111 when the spool 13 is in its neutral position. A connecting pin 113 extending through a hole 111 has one end securely fitting into the hole 112 and the other end fitting into the groove 110. In this way, the pin 113 connects the valve spool 13 and the sleeve 50 so that the valve spool 13 moves axially with axial displacement the sleeve 50. The dimensions of the hole 111 are chosen so as to allow movement of the connecting pin 113 within a preset axial range with respect to the gear housing 8.

A return spring 23 urges the valve spool 13 with respect to the valve housing 12 toward its neutral position when the valve spool 13 is displaced from its neutral position.

In operation, when a steering wheel (not shown) is turned, the input shaft 2 rotates relative to the output shaft 3 and the torsion bar 6 twists. The degree of relative rotation of the input shaft 2 depends on the level of steering force input. As the input shaft 2 rotates relative to the output shaft 3, the balls 103 move circumferentially together with the input shaft 2 and simultaneously move axially along the grooves 100 and 101. It should be noted that the arrangement of the mutually oblique grooves 100 and 101 causes the axial displacement of the balls 103. The direction of axial movement of the balls 103 depends on the direction of rotation of the input shaft 2 relative to the output shaft 3.

The axial movement of the balls 103 causes the sleeve 50 to move axially, thereby displacing the valve spool 13 axially. In accordance with axial displacement of the valve spool 13, the control valve 11 adjusts the oil pressure to the power cylinder 19, boosting the steering force input and thus assisting the steering operation. As the rotational displacement of the input shaft 2 relative to the output shaft 3 increases, that is, as the steering force input increases, the axial displacement of the sleeve 50 and that of the valve spool 13 also increase. As the axial displacement of the valve spool 13 increases, the oil pressure supplied to the power cylinder 19 rises and thus the force assisting the steering operation increases. Accordingly, as the steering force input increases, the force assisting the steering operation increases. This makes steering easy even in cases where the steering wheel needs to be rotated through a large angular interval.

When the power cylinder 19 assists the steering operation, the rack 4 moves together with the piston 19c, rotating the output shaft 3 relative to the input shaft 2 and enabling the output shaft 3 to follow the input shaft 2 with a negligible response lag. As the output shaft 3 rotates relative to the input shaft 2, the balls 103 reverse so that the sleeve 50 and the valve spool 13 return axially.

While the sleeve 50 moves axially in accordance with axial displacement of the balls 103, the balls 103 rotate on the surfaces of the sleeve 50 so that the tangential force on the sleeve 50 is negligible. Even if the sleeve 50 should rotate, the connecting pin 113 would slide along the circumferential groove 110, preventing the valve spool 13 from rotating. Accordingly, the valve spool 13 moves only in the axial direction.

The valve spool 13 and each of the shafts 2 and 3 are wholly outside one another and are separated. There is no member rotating relative to the valve spool 13 and contacting the valve spool 13. It is thus unnecessary for the valve spool 13 and the elements in contact with the valve spool 13 to be formed within severe tolerances of true circles.

An arrangement for transmitting movement from the shafts 2 and 3 to the valve spool 13 includes the balls 103, the sleeve 50, and the connecting pin 113. This arrangement is simpler than the corresponding structure in Japanese patent publication No. 55-123566.

The circumferential grooves 102 and 110 are preferably offset axially to minimize the radial thickness of the walls of the sleeve 50.

It should be noted that the grooves 102 and 110 should extend far enough to allow fully free rotation of the input shaft 2. In addition, the sleeve 50 may have holes for each of the balls 103 in place of the circumferential groove 102.

Figure 3:
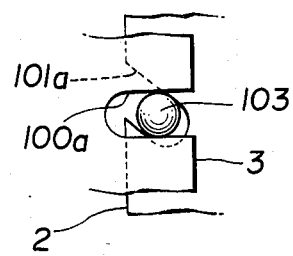
FIG. 3 is a plan view, similar to FIG. 2, of a modification of the system of FIG. 1.

FIG. 3 shows a modification to the embodiment of FIGS. 1 and 2. In this modification, the input shaft 2 has spiral grooves 101a while the output shaft 3 has axial grooves 100a oblique to the grooves 101a. The balls 103 fit into these grooves 100a and 101a. This modification operates similarly to the embodiment of FIGS. 1 and 2.

In this modification, the output shaft 3 may also have spiral grooves in place of the axial grooves 100a, provided the spiral grooves of the output shaft 3 remain oblique to the spiral grooves 101a of the input shaft 2.

Figure 4:
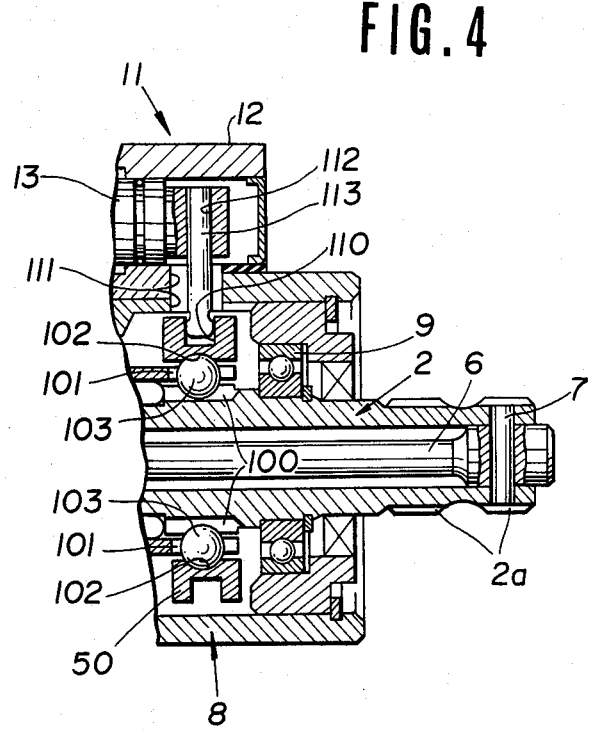
FIG. 4 is a longitudinal section view of part of a power steering system according to a second embodiment of this invention.

FIG. 4 snows a second embodiment of this invention. This embodiment is similar to the embodiment of FIGS. 1 and 2 except for the following design change.

The circumferential grooves 102 and 110 are concentric and overlap in the radial direction. This arrangement enables the axial dimension of the sleeve 50 to be smaller than that of the sleeve of the embodiment of FIGS. 1 and 2.

The embodiment of FIG. 4 operates similarly to the embodiment of FIGS. 1 and 2.

Figure 5:
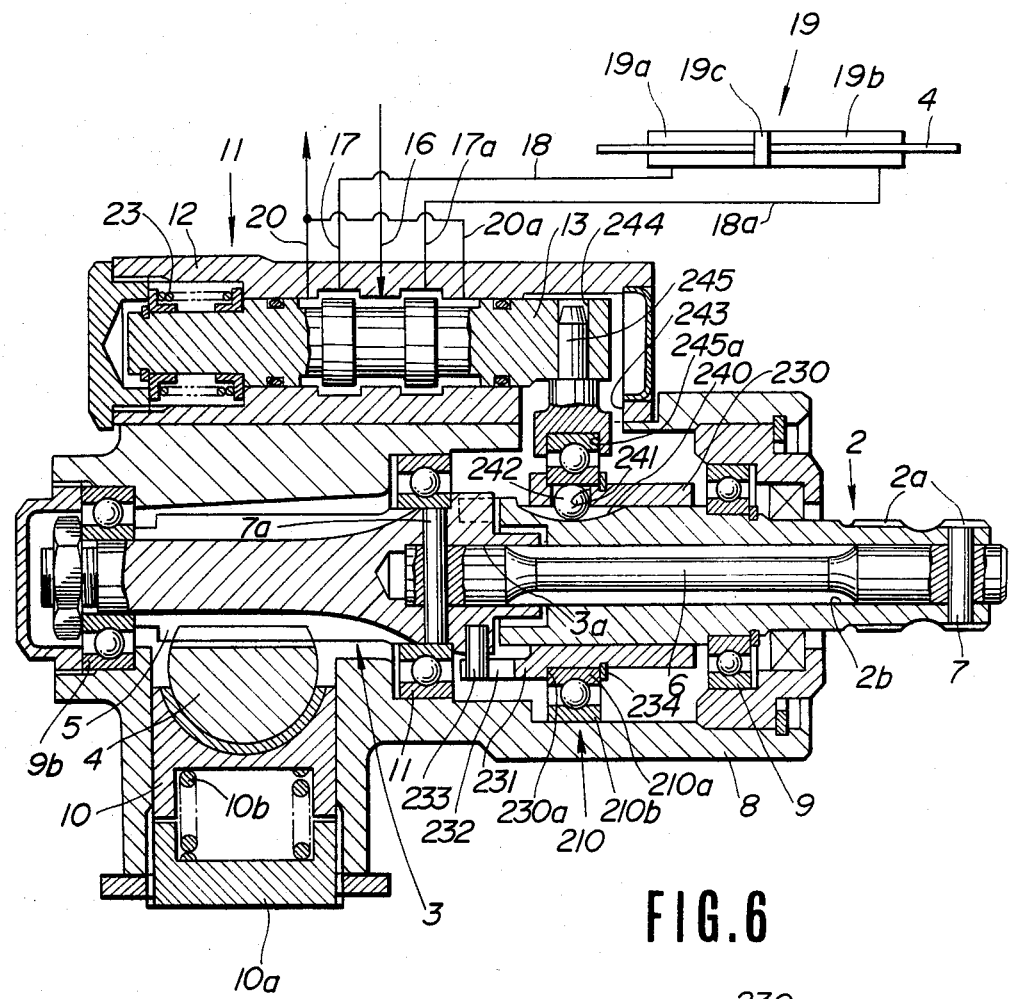
FIG. 5 is a longitudinal section view, partly diagrammatic, of a power steering system according to a third embodiment of this invention.
Figure 6:
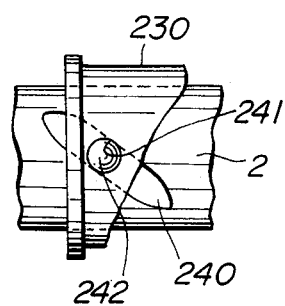
FIG. 6 is a plan view, similar to FIG. 2, of part of the system of FIG. 5.

FIGS. 5 and 6 show a third embodiment of this invention. This embodiment is similar to the embodiment of FIGS. 1 and 2 except for the following design changes.

A sleeve 230 fitting coaxially around the input shaft 2 can rotate about and move axially relative to the input shaft 2. The sleeve 230 has an axial extension 231 overlapping the output shaft 3. A pin 233 fixedly embedded in the output shaft 3 extends radially into an axial slit 232 through the extension 231. The sleeve 230 and the output shaft 3 engage via the pin 233. This engagement causes the sleeve 230 to rotate together with the output shaft 3 but allows the sleeve 230 to move axially independent of the output shaft 3.

A bearing 210 supporting the input shaft 2 on the gear housing 8 includes an inner race 210a and an outer race 210b rotatable relative to the inner race 210a. The inner race 210a is seated between a snap ring 234 and an annular step 230a on the sleeve 230. The snap ring 234 fits securely around the sleeve 230. The outer race 210b slidably abuts the inner surfaces of the gear housing 8.

The outer circumferential surface of the input shaft 2 has spiral grooves 240 spaced circumferentially at substantially equal angular intervals. The sleeve 230 has holes 241 opposing the respective spiral grooves 240. A ball 242 fits snugly into each of the spaces defined by the grooves 240 and the holes 241. The balls 242 slidably engage the input shaft 2 and the sleeve 230. Also, the balls 242 slidably abut the inner surface of the bearing inner race 210a, which seals the outer ends of the holes 241. In other words, the bearing inner race 210a and the sleeve 230 define recesses 241 receiving the balls 242.

A ball 242, and the spiral groove 240 and the hole 241 receiving this ball constitute a set. In this invention, there are two or more sets spaced circumferentially at substantially equal angular intervals. This arrangement reliably prevents radial play in the sleeve 230 while allowing smooth axial and rotational movement of the sleeve 230.

The walls of the gear housing 8 and the valve housing 12 share an opening 243 radially outside of the bearing 210. The right-hand end of the valve spool 13 has a diametrical hole 244. One end of a connecting pin 245 securely fits into the hole 244. The connecting pin 245 passes through the opening 243. The other end of the connecting pin 245 has a groove 245a lying in the plane of rotation of the bearing 210. The outer race 210b of the bearing 210 securely fits into the groove 245a. In this way, the pin 245 connects the bearing 210 and the valve spool 13. The dimensions of the opening 243 are designed so as to allow the connecting pin 245 to move freely axially with respect to the sleeve 230.

In operation, when a steering wheel (not shown) is turned, the input shaft 2 rotates relative to the output shaft 3 and the torsion bar 6 twists. The degree of relative rotation of the input shaft 2 depends on the level of steering force input. Since the sleeve 230 is angularly fixed to the output shaft 3 via the pin 233, the input shaft 2 rotates relative to the sleeve 230 in accordance with rotation of the input shaft 2 relative to the output shaft 3.

As the input shaft 2 rotates relative to the sleeve 230, the balls 242 move along the spiral grooves 240 on the input shaft 2. This movement of the balls 242 drives the sleeve 230 axially. The bearing 210 moves axially together with the sleeve 230.

Since the valve spool 13 is connected to the outer race 210b of the bearing 210 via the connecting pin 245, the valve spool 13 moves axially together with the outer race 210b. In accordance with the axial displacement of the valve spool 13, the control valve 11 adjusts the oil pressure applied to the power cylinder 19, boosting the steering force and thus assisting the steering operation.

When the power cylinder 19 assists the steering operation, the rack 4 moves together with the piston 19c, rotating the output shaft 3 relative to the input shaft 2 and enabling the output shaft 3 to follow the input shaft with a negligible response lag. As the output shaft 3 rotates relative to the input shaft 2, the sleeve 230 similarly rotates relative to the input shaft 2, reversing the balls 242 and returning the bearing 210 and the valve spool 13 axially. Since the bearing inner race 210a rotates relative to the bearing outer race 210b while the sleeve 230 rotates, any rotational force is not transmitted to the valve spool 13. This ensures that the valve spool 13 moves only in the axial direction.

The balls 242, the sleeve 230, the bearing 210, and the connecting pin 245 constitute a transmission which conducts only axial movement to the valve spool 13. This movement transmission is simpler than the corresponding structure in Japanese patent publication No. 55-123566.

The spiral grooves 240 may be formed on the sleeve 230, in which case the holes 241 would be formed in the input shaft 2.

The sleeve 230 may slidably fit around the output shaft 3 in place of the input shaft 2. In this case, the sleeve 230 would be connected to the input shaft 2 so that the sleeve 230 would rotate together with the input shaft 2 but be free to move axially relative to the input shaft. Furthermore, either the spiral grooves 240 or the holes 241 may be formed in the sleeve 230, to others being formed in the output shaft 3.

The axis of the control valve 11 may be inclined with respect to the axes of the input and output shafts 2 and 3. In this case, the arrangement connecting the input shaft 2 and the control valve 11 should be modified accordingly.

Rollers may be used in place of the balls 242.

What is claimed is:

1. A power steering system comprising:
   (a) an input shaft and an output shaft;
   (b) a deformable torsion bar connected between the input and output shafts for allowing the input shaft to rotate relative to the output shaft in response to a steering force transmitted to the input shaft;
   (c) a pressure-responsive actuator;
   (d) a control valve including a movable valve spool and being operative to adjust pressure supplied to the actuator in accordance with the axial position of the valve spool, the valve spool and the input shaft being wholly outside one another, the valve spool and the output shaft being wholly outside one another; and
   (e) means for moving the valve spool only in the axial direction as the input shaft rotates relative to the output shaft, said moving means including:
      (a) a sleeve movably encircling the input and output shafts;
      (b) a movable member disposed within a space defined by a groove in the input shaft, a groove in the output shaft oblique to the groove in the input shaft, and a recess in the sleeve; and
      (c) means for connecting the sleeve and the valve spool.

2. The power steering system of claim 1, wherein the groove in the input shaft extends axially and the groove in the output shaft extends spirally.

3. The power steering system of claim 1, wherein the groove in the input shaft extends spirally and the groove in the output shaft extends axially.

4. The power steering system of claim 1, wherein the movable member comprises a ball.

5. A power steering system comprising:
   (a) an input shaft and an output shaft;
   (b) a deformable torsion bar connected between the input and output shafts for allowing the input shaft to rotate relative to the output shaft in response to a steering force transmitted to the input shaft;
   (c) a pressure-responsive actuator;
   (d) a control valve including a movable valve spool and being operative to adjust pressure supplied to the actuator in accordance with the axial position of the valve spool, the valve spool and the input shaft being wholly outside one another, the valve spool and the output shaft being wholly outside one another; and
   (e) means for moving the valve spool only in the axial direction as the input shaft rotates relative to the output shaft, said moving means including:
      (a) a sleeve encircling the input shaft;
      (b) means connecting the sleeve to the output shaft for corotation while allowing the sleeve to move axially;
      (c) a movable member disposed within a space defined by an oblique groove in the input shaft and a recess in the sleeve;
      (d) a connecting member fixed to the valve spool; and
      (e) a bearing disposed between the sleeve and the connecting member for allowing the sleeve to rotate relative to the connecting member.

6. A power steering system comprising:
   (a) an input shaft and an output shaft;
   (b) a deformable torsion bar connected between the input and output shafts for allowing the input shaft to rotate relative to the output shaft in response to a steering force transmitted to the input shaft;
   (c) a pressure-responsive actuator;
   (d) a control valve including a movable valve spool and being operative to adjust pressure supplied to the actuator in accordance with the axial position of the valve spool, the valve spool and the input shaft being wholly outside one another, the valve spool and the output shaft being wholly outside one another; and
   (e) means for moving the valve spool only in the axial direction as the input shaft rotates relative to the output shaft, said moving means including:
      (a) a sleeve encircling the input shaft;
      (b) means connecting the sleeve to the output shaft for corotation while allowing the sleeve to move axially;
      (c) a movable member disposed within a space defined by an oblique groove in the input shaft and a recess in the sleeve;
      (d) a connecting member fixed to the valve spool; and
      (e) a bearing disposed between the sleeve and the connecting member for allowing the sleeve to rotate relative to the connecting member, said bearing being supported by a housing and movable in the axial direction with the sleeve.

* * * * *